(12) United States Patent
Detwiler

(10) Patent No.: US 6,237,851 B1
(45) Date of Patent: May 29, 2001

(54) DUAL MODE BARCODE SCANNER

(75) Inventor: Paul O. Detwiler, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/280,611

(22) Filed: Mar. 29, 1999

(51) Int. Cl.⁷ ............... G06K 7/10; G02B 26/12; G02B 26/10
(52) U.S. Cl. ............... 235/462.38; 235/462.36; 235/462.37; 235/462.39
(58) Field of Search ............ 235/462.35, 462.36, 235/462.37, 462.38, 462.39, 462.4

(56) References Cited

U.S. PATENT DOCUMENTS

| | | | |
|---|---|---|---|
| 4,093,865 | * 6/1978 | Nickl | 250/566 |
| 4,652,732 | * 3/1987 | Nicki | 235/462.4 |
| 5,039,184 | * 8/1991 | Murakawa et al. | 359/216 |
| 5,229,588 | * 7/1993 | Detwiler et al. | 235/462.35 |
| 5,459,308 | * 10/1995 | Detwiler et al. | 235/462.35 |
| 5,475,207 | 12/1995 | Bobba et al. | 235/467 |
| 5,498,862 | 3/1996 | Edler | 235/457 |
| 5,557,093 | 9/1996 | Knowles et al. | 235/462.32 |
| 5,591,954 | 1/1997 | Spencer | 235/467 |
| 5,689,102 | 11/1997 | Schonenberg et al. | 235/467 |
| 5,705,802 | * 1/1998 | Bobba et al. | 235/462.39 |
| 5,886,336 | * 3/1999 | Tang et al. | 235/462.43 |
| 5,975,417 | * 11/1999 | Spencer et al. | 235/462.36 |
| 6,059,189 | * 5/2000 | Detwiler et al. | 235/467 |
| 6,076,735 | * 6/2000 | Saegusa | 235/462.4 |

FOREIGN PATENT DOCUMENTS

4424008 * 1/1996 (DE) .

* cited by examiner

*Primary Examiner*—Michael G. Lee
*Assistant Examiner*—Jamara A. Franklin
(74) *Attorney, Agent, or Firm*—Francis L. Conte

(57) ABSTRACT

A barcode scanner includes a laser for emitting a laser beam toward a rotary spinner. The spinner includes a plurality of mirror facets for reflecting the beam in turn therefrom towards a plurality of pattern mirrors. The mirrors in turn reflect the beam to form corresponding scan lines emitted through a window. The pattern mirrors are optically aligned with the spinner to effect a pattern of scan lines on the window including first and second sets extending substantially completely across the height and width thereof. The pattern mirrors laterally invert position of scan lines in the first set inside a scan zone extending perpendicularly outwardly from the window.

20 Claims, 7 Drawing Sheets

DUAL MODE BARCODE SCANNER

BACKGROUND OF THE INVENTION

The present invention relates generally to barcode scanners, and, more specifically, to a stationary barcode scanner.

Barcode scanners are commonly found in retail establishments such as supermarkets which require relatively high speed scanning effectiveness in view of the large number of products which are typically being purchased. In this application, either horizontal or vertical, or both, pass-by barcode scanners may be used for increasing the likelihood and speed of scanning a barcode laterally swiped horizontally across the window thereof.

In department stores, counter space is limited, and the scanner is typically located where pass-by scanning cannot be used. Instead, a presentation scanner is used which permits barcodes to be presented to the scanner with a motion that is parallel to the window normal, i.e., perpendicular to the window.

A typical barcode is printed on a label and includes a series of alternating dark bars and white spaces therebetween of varying width in a one-dimensional array in accordance with the Universal Product Code (UPC) for example. The series of bars are vertically straight and stacked horizontally parallel to each other in the form of a picket fence, and are therefore typically referred to as a picket barcode.

In order to read the barcode, the scanner produces one or more scan lines which must traverse the bars and spaces of the barcode in sequence for correspondingly absorbing and reflecting light therefrom. The reflected light is therefore modulated by the barcode and follows a reverse path into the scanner and is detected by a photodetector and decoded in an electrical processor for determining the information encoded in the barcode, typically used for identifying the attached product and its price.

In this way, a barcode may be quickly read and decoded provided, however, that one or more scan lines properly traverse the barcode. Since the barcode is attached at different locations on different products and may be presented to the scanner in different orientations, a scan line may not properly traverse the barcode resulting in a reading failure.

For this reason, various types of barcode scanners have been developed including handheld and stationary vertical or horizontal scanners or the combination thereof for improving the likelihood of properly reading and decoding a barcode presented in any orientation. The different types of scanners enjoy different benefits, with associated disadvantages including complexity, size, and cost.

The typical stationary scanner is relatively complex, large, and expensive since it includes a rotating spinner having mirror facets which reflect a laser beam along an arcuate path over several pattern mirrors to produce a pattern of differently directed scan lines through a window over which the barcode may be swiped or presented. The scan line pattern is controlled by relative orientation of the individual pattern mirrors and the spinner facets, and is repeated once per revolution of the spinner.

Each spinner facet is typically disposed at a different inclination angle so generally parallel sets of scan lines may be produced from a common set of pattern mirrors cooperating with the spinner. The proper selection and orientation of spinner facets and pattern mirrors is critical for effecting a corresponding scan pattern for reading barcodes. However, many comprises are typically made in configuring the scanner in view of the complexity thereof, and therefore different scanners have different capabilities and disadvantages.

For example, scanners are typically limited in their ability to read the various orientations of the barcode being scanned. The basic one-dimensional barcode is a picket barcode as described above. As such, it requires at least a single scan line to horizontally traverse in sequence each of the vertical bars thereon in order to obtain a complete scan thereof. However, if the picket barcode is rotated 90° from its horizontal orientation to a vertical orientation it then becomes the commonly known ladder barcode with the bars extending horizontally and being stacked vertically. In this orientation, a horizontal scan line cannot read the barcode, but a vertically directed scan line is required for vertically traversing in turn the bars for reading the barcode.

The barcode may also have inclined orientations between the picket and ladder orientations including, for example, diagonal orientations 45° counterclockwise from the vertical or 450 clockwise from the vertical. These diagonal barcodes require different scan lines in order to properly traverse the inclined bars over the full length of the barcode to perfect a scan.

Since the complexity of the scanner increases as the number of scan lines increases and their orientation in space differs, there is a practical limit requiring compromise in each type of barcode scanner. Different scanners have different capability for reading the four basic barcode orientations, and the scanner design is rendered even more complex depending upon the intended direction of barcode swiping or presentation. In a pass-by scanner, a barcode is typically swiped in a horizontal plane, and the scan pattern is specifically configured to maximize the likelihood of an effective scan thereof. Correspondingly, the pass-by pattern has coverage gaps and lacks effective scanning capability for presentation scanning.

A presentation scanner typically has a small pattern at its window which expands outwardly therefrom, and thusly lacks effective scanning capability for pass-by scanning.

Accordingly, it is desired to provide an improved barcode scanner configured for both pass-by and presentation operation, and which is relatively compact in size yet provides full coverage scanning of barcodes in multiple orientations.

BRIEF SUMMARY OF THE INVENTION

A barcode scanner includes a laser for emitting a laser beam toward a rotary spinner. The spinner includes a plurality of mirror facets for reflecting the beam in turn therefrom towards a plurality of pattern mirrors. The mirrors in turn reflect the beam to form corresponding scan lines emitted through a window. The pattern mirrors are optically aligned with the spinner to effect a pattern of scan lines on the window including first and second sets extending substantially completely across the height and width thereof. The pattern mirrors laterally invert position of scan lines in the first set inside a scan zone extending perpendicularly outwardly from the window.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
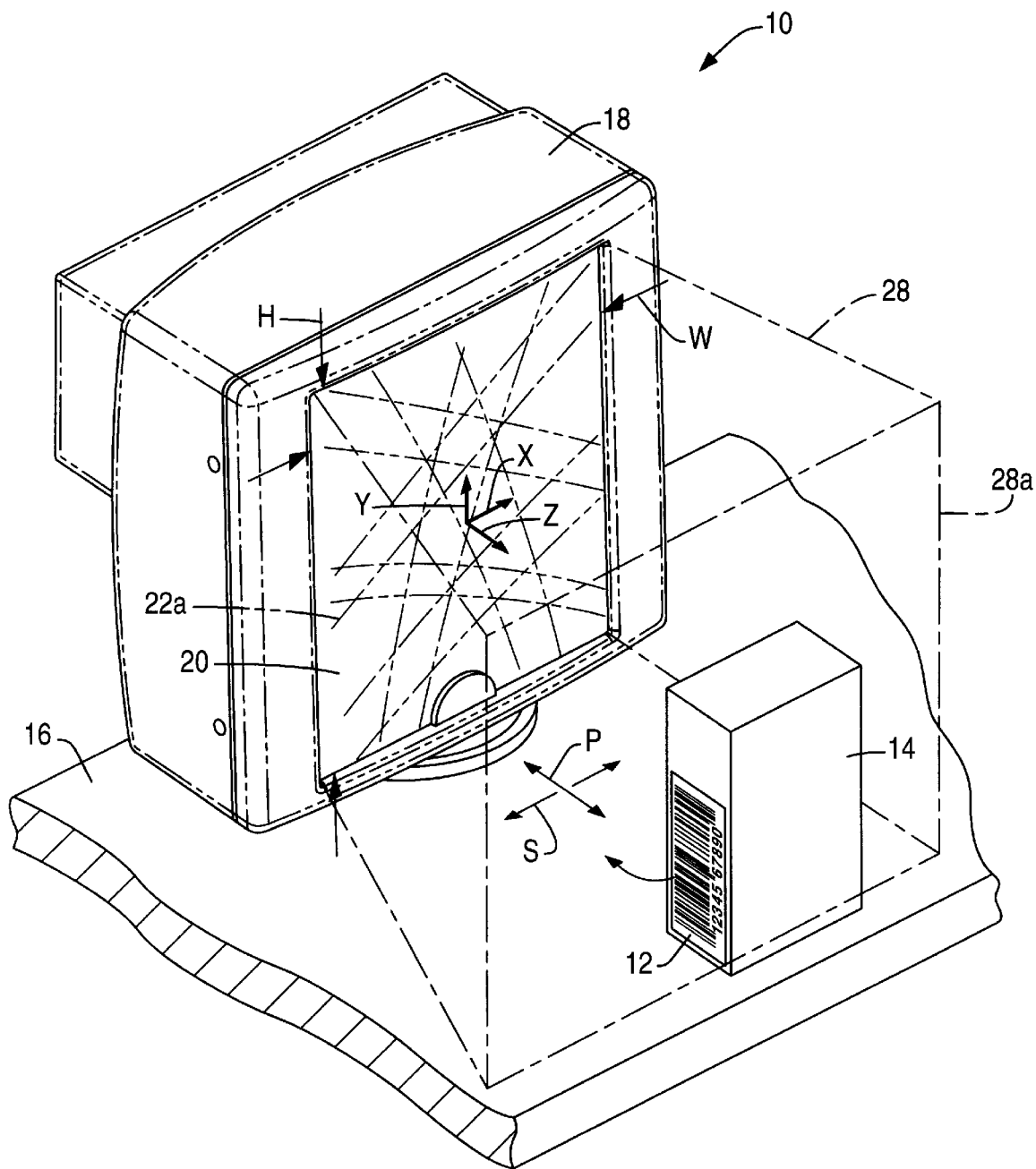
FIG. 1 is an isometric view of a dual mode barcode scanner mounted atop a counter in accordance with an exemplary embodiment of the present invention.

Illustrated in FIG. 1 is a dual mode barcode scanner 10 in accordance with an exemplary embodiment of the present invention for use in a point of sale (POS) terminal in a retail establishment. The terminal itself may take any conventional form including an electronic cash register operatively joined to the scanner 10 for scanning a barcode 12 printed on a label secured to a product or merchandise 14 for example. The barcode 12 may take any conventional form such as a one-dimensional barcode having a series of alternating dark bars and white spaces of varying width in accordance with the UPC format for example.

The scanner 10 is preferably mounted in a vertical orientation atop a horizontal counter 16, and is configured in accordance with the present invention for dual mode operation. The scanner 10 includes a housing 18 in which its various components are suitably mounted, and has a vertically oriented transparent aperture or window 20 in front of which the barcode may be swiped or presented for the reading and decoding thereof.

The product may be moved past the window in a pass-by operation in which the barcode is laterally traversed or swiped in a horizontal direction as indicated by the direction arrow S. Alternatively, the product may be presented to the window in a presentation operation in which the barcode is moved in and out perpendicularly thereto as indicated by the direction arrow P.

Figure 2:
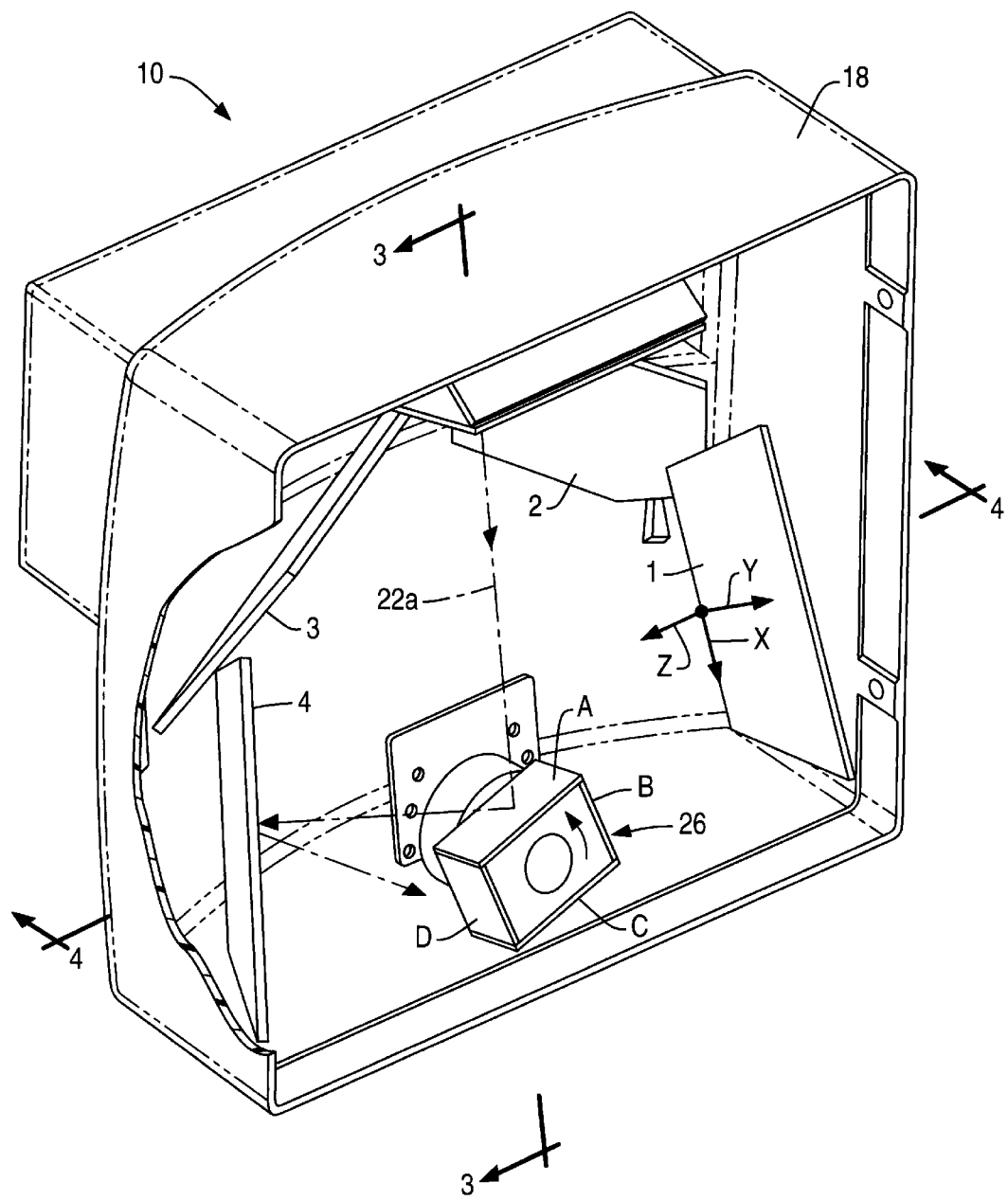
FIG. 2 is a cutaway view of the scanner shown in FIG. 1 illustrating a rotary spinner and cooperating pattern mirrors therein.
Figure 3:
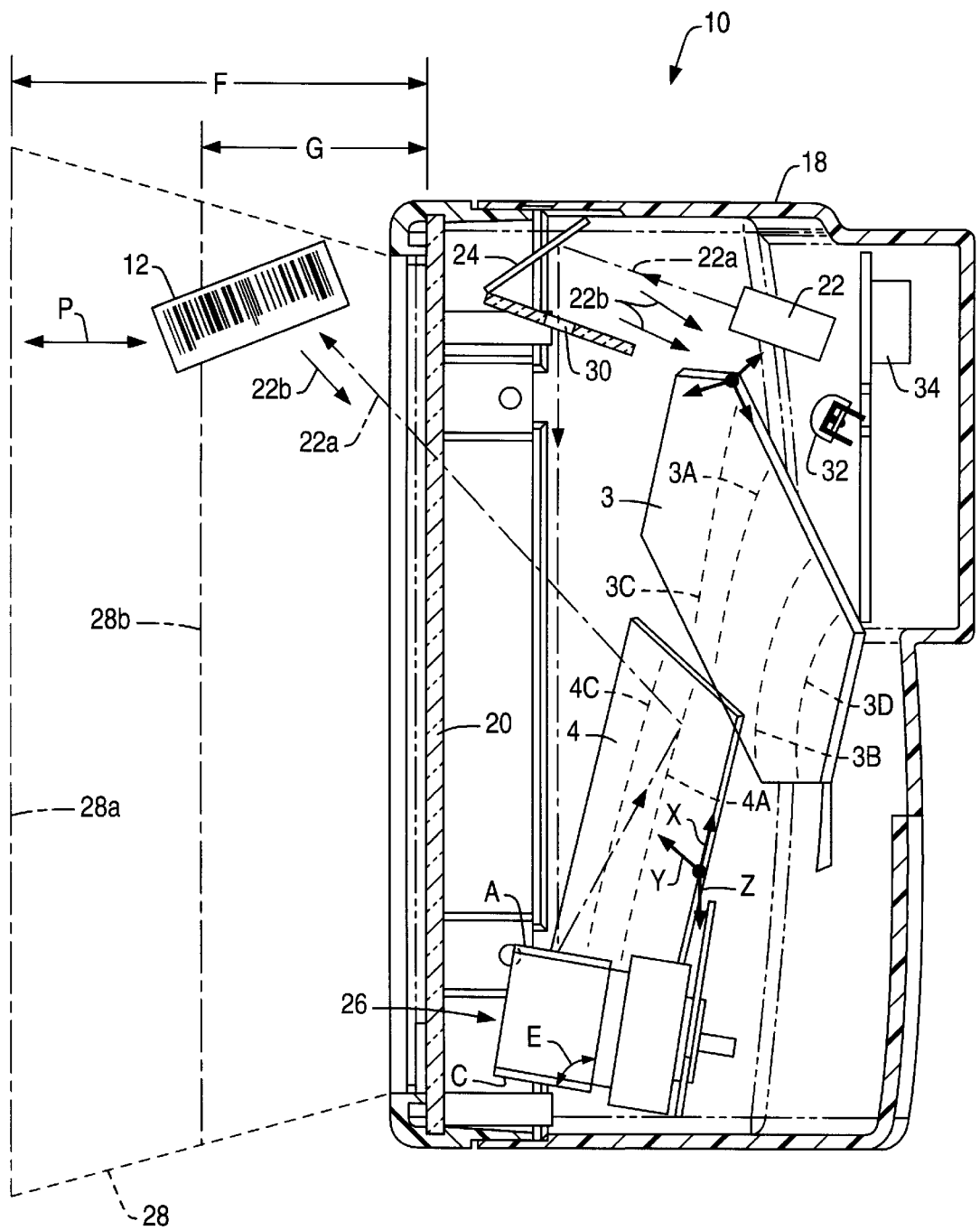
FIG. 3 is a partly sectional, elevational side view through the scanner illustrated in FIG. 2 and taken along line 3—3.

The scanner is illustrated in cutaway view in FIG. 2 and in section view in FIG. 3. As shown initially in FIG. 3, the scanner includes a laser 22, which may be in the form of a laser diode for example, for emitting an outbound scanning laser beam 22a which is suitably directed by reflection off a folding mirror 24 toward a rotary spinner 26.

The spinner 26 includes an internal motor effective for rotating the spinner in the exemplary counterclockwise direction illustrated in FIG. 2. The spinner 26 includes a plurality of mirror facets A,B,C,D optically aligned with the laser for reflecting the beam in turn therefrom as the spinner rotates.

The individual spinner facets are preferably oriented at different inclination angles E for reflecting the laser beam 22a in correspondingly different paths as shown in FIG. 3. For example, there are four spinner facets A,B,C,D which reflect corresponding portions of the beam 22a in different directions for each revolution of the spinner 26.

As initially shown in FIG. 1, a global XYZ coordinate system is defined with its origin at the center of the window 20 with a X axis pointing to the right when viewed from the front of the scanner. The Y axis points vertically upwardly. And, the Z axis points outwardly from the window, and normal or perpendicular thereto for collectively effecting a three axis orthogonal coordinate system. Accordingly, the swiping direction S is along the X axis in either left or right directions. And the presentation direction P is along the Z axis toward or away from the window.

Figure 4:
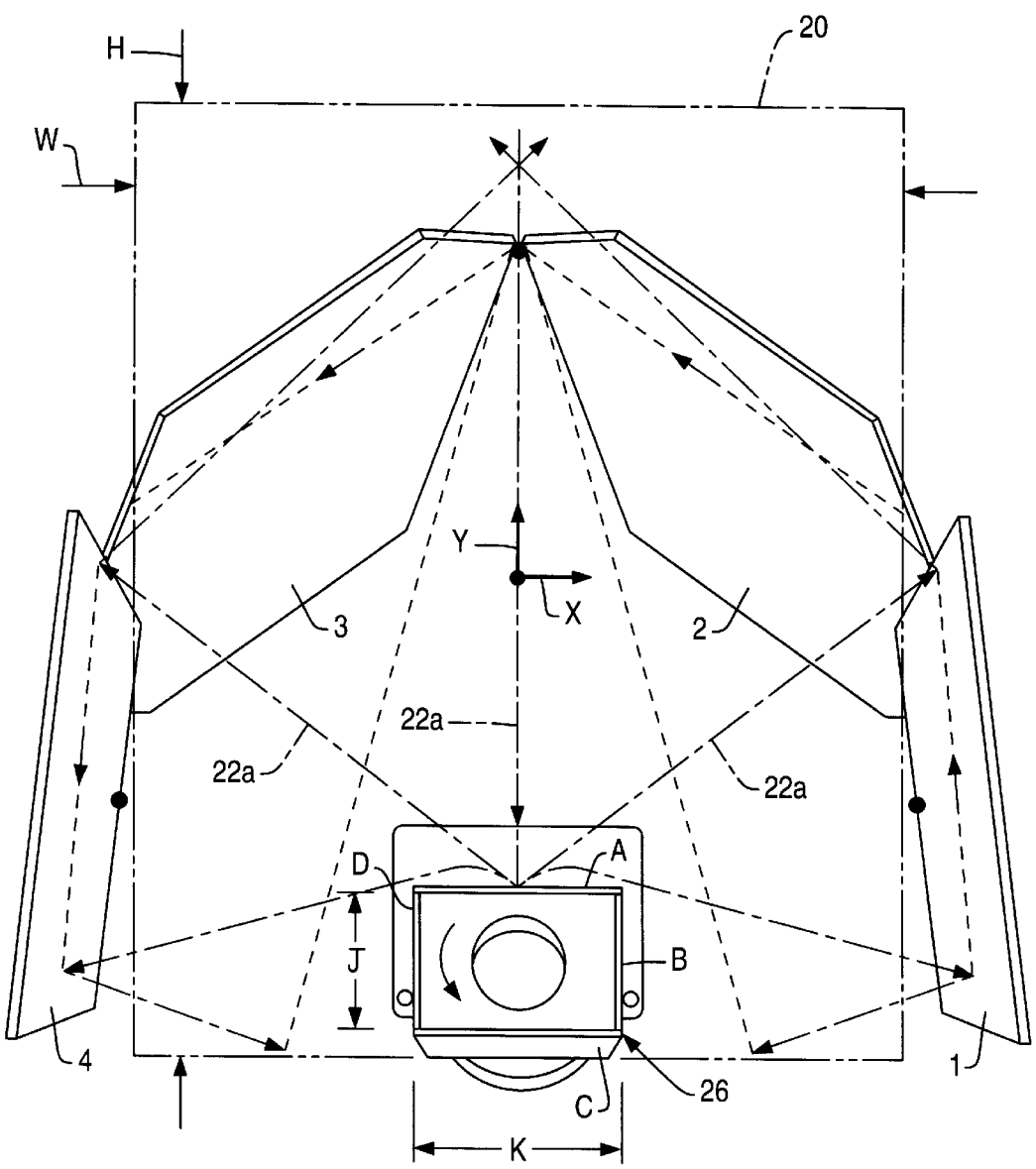
FIG. 4 is a front view of the spinner and cooperating pattern mirrors in the scanner illustrated in FIG. 2 and taken along line 4–4.
Figure 5:
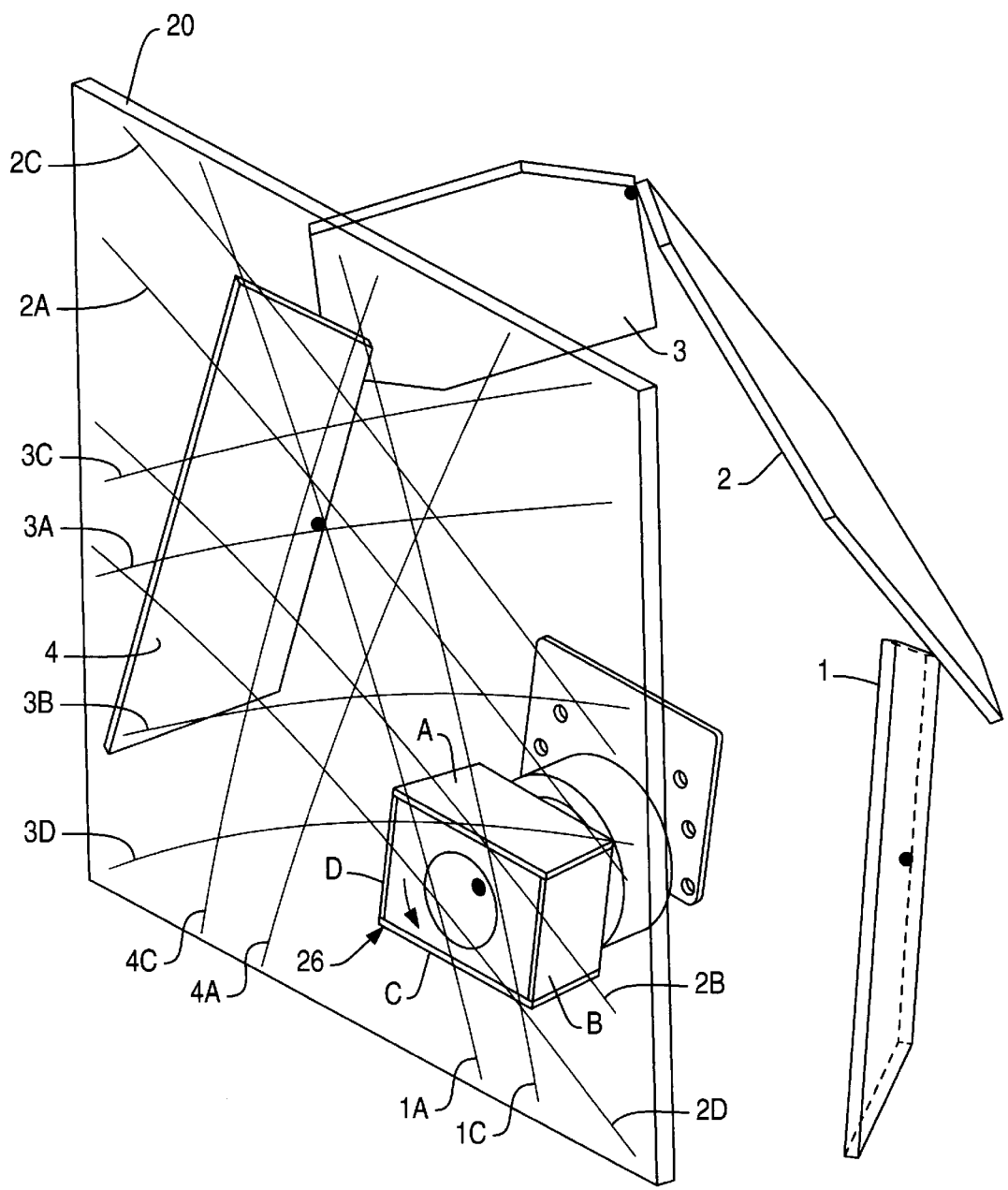
FIG. 5 is an isometric view of the spinner and pattern mirrors illustrated in FIG. 4 behind the scanner window.
Figure 6:
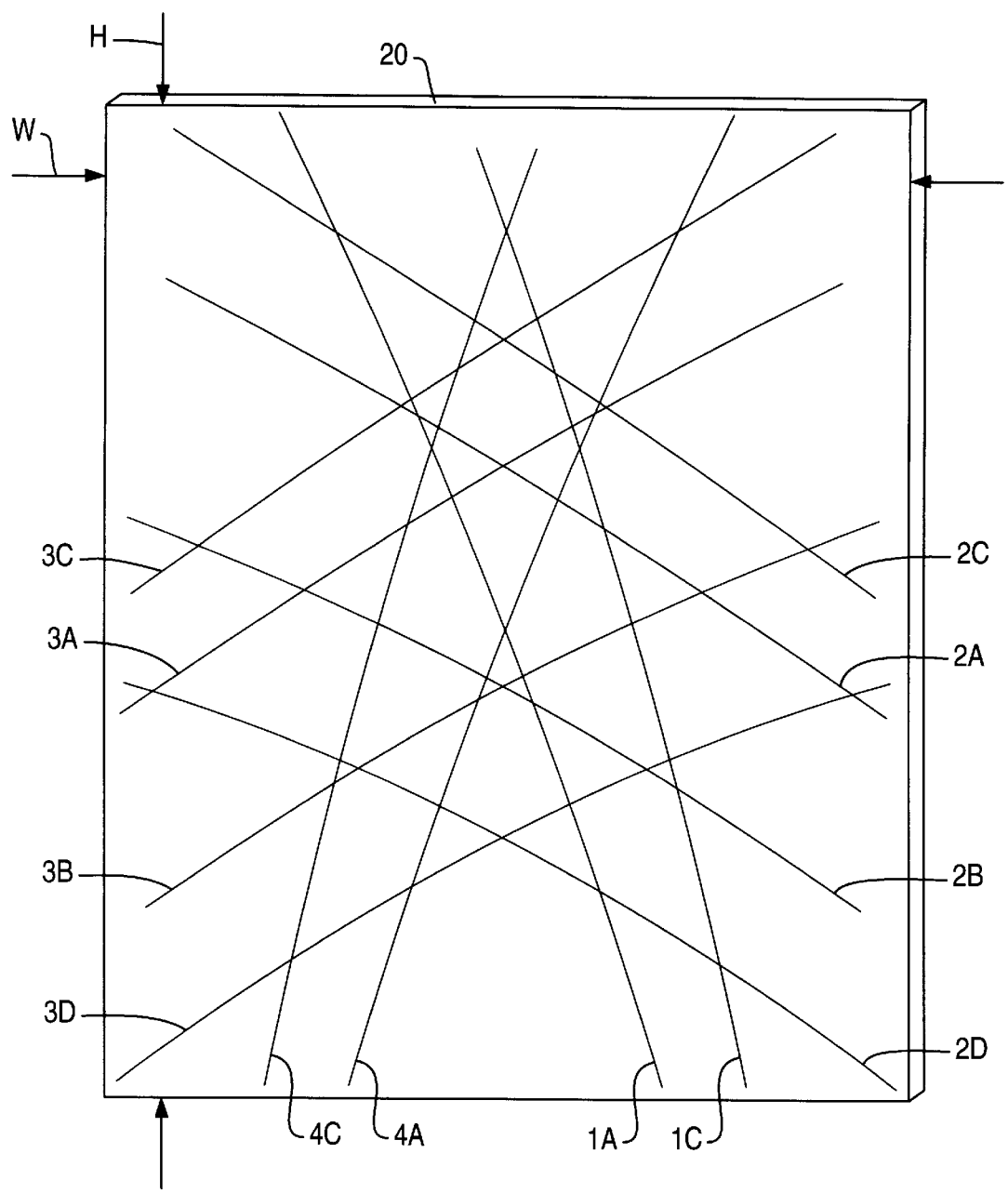
FIG. 6 is plan view of the scanner window illustrated in FIGS. 1 and including a pattern of scan lines traced thereacross during operation.

As shown in FIGS. 2–5, a plurality of pattern mirrors 1-4 are optically aligned directly with the spinner 26 substantially symmetrically about the vertical axis Y for reflecting in turn the beam 22a to form corresponding symmetric scan lines shown in detail in FIG. 6. The pattern mirrors are designated by the numerals 1 through 4 in the order in which the laser beam 22a traverses the mirrors upon reflection from the spinner facets A,B,C,D moving with the counterclockwise rotating spinner 26. The individual scan lines are therefore identified by the combination of the specific pattern mirror and the specific spinner facet which trace the scan lines from the first scan line 1A to the last scan line 4D for each revolution of the spinner 26. Accordingly, the scan line pattern illustrated in FIG. 6 is collectively formed by firstly reflecting the laser beam 22a directly off each of the spinner facets A,B,C,D in turn and secondly reflecting the beam directly from the pattern mirrors 1–4 corresponding with each facet as described in more detail hereinbelow.

As shown in FIG. 2, the spinner 26 is centrally disposed at the bottom center of the housing 18, and the pattern mirrors 1–4 circumferentially surround the spinner in part over about 180°. The window 20 is rectangular and is disposed adjacent the mirrors, and also covers the spinner for transmitting the scan lines formed by the laser beam 22a outwardly from the window and across the barcode 12, as also shown in FIGS. 1 and 3. The window 20 has a width W along the first axis X extending between left and right sides. The window has a height H along the second axis Y extending between the window top and bottom. The window width is about 12 cm for example, and the window height is about 15 cm for example.

The pattern mirrors 1–4 are collectively positioned around the spinner 26 to produce or effect a substantially symmetrical pattern of the scan lines on or at the window 20 extending substantially completely across the width and height thereof for correspondingly providing dual mode scanning capability.

The window illustrated in FIG. 1 is preferably disposed vertically, with the first axis X and window width W extending horizontally, and the second axis Y and window height H extending vertically upwardly for effecting a pass-by scanner. In this way, the barcode 12 may be swiped in a horizontal plane in the swiping direction S in front of the window 22 for pass-by scanning at any vertical position along the full height of the window.

As shown in FIGS. 1 and 3, the laser beam 22a is directed outwardly from the window into a scan volume or zone 28. The window defines the back end of the scan zone and the zone extends perpendicularly outwardly therefrom along the third axis Z to a front end 28a disposed at a normal spacing F therefrom as illustrated in FIG. 3. This depth F of the scan volume may be about 15 cm for example, or slightly larger if desired. The scan zone also includes a middle plane 28b spaced midway between the front and back ends at a spacing G of about 7.5 cm for example.

The scan line pattern effected by the laser beam 22a emitted through the window 20 substantially covers the corresponding rectangular scan zone 28 for additionally permitting effective presentation scanning of the barcode 1 2 along the third axis Z. Dual mode scanning is thereby effected for scanning the barcode either in the pass-by direction S or in the presentation direction P. Such dual mode capability is effected by the cooperation of the specifically configured and positioned pattern mirrors 1–4 and spinner facets A–D.

More specifically, the pattern mirrors are collectively positioned around the spinner to effect a specific pattern of the scan lines on the window 20 as illustrated in FIG. 6 including a first, or generally vertical, set of scan lines 1A,1C,4A,4C extending substantially completely across the window height from top to bottom thereof for full height coverage. A second, or generally diagonal, set of the scan lines 2A,2B,2C,2D, and 3A,3B,3C,3D extend substantially completely across the window width from left to right side for full width coverage.

These twelve scan lines intersect each other at different angles at the scanner window for ensuring a successful scan of the barcode oriented either in ladder or picket forms, or diagonal orientations therebetween. Furthermore, the scan line pattern as illustrated in FIG. 7 expands into the scan zone 28 and provides effective coverage for both pass-by and presentation scanning.

In particular, corresponding ones of the pattern mirrors are positioned to laterally invert position of scan lines in the first set inside the scan zone between the back and front ends thereof. And, the emitted laser beam 22a may be directed downwardly toward the window bottom for producing scan lines in the second set for ensuring the dual mode capability of the scanner for effective scanning in both the pass-by and presentation modes.

Figure 7:
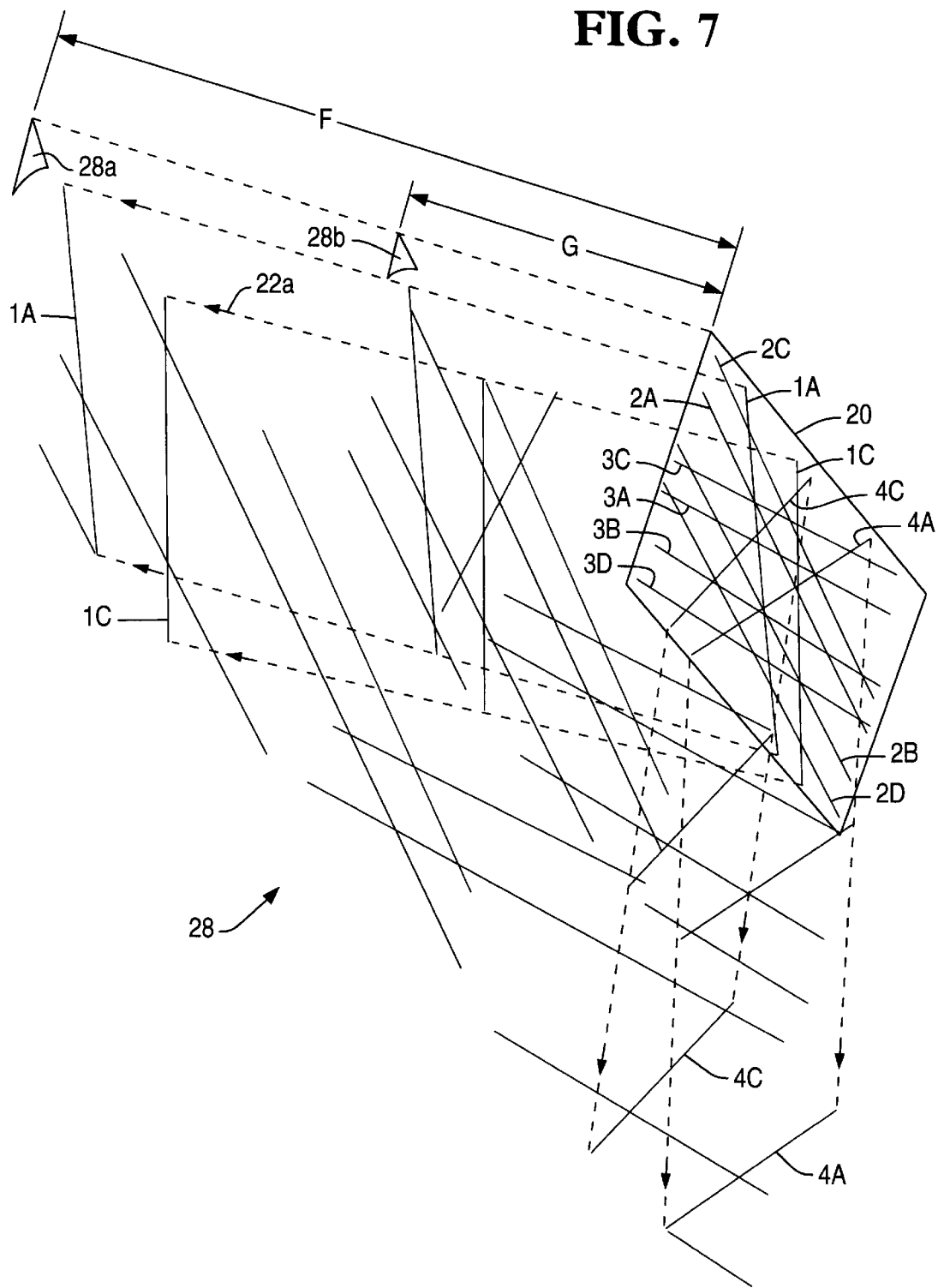
FIG. 7 is an isometric view of the scanner window including the scan line pattern thereon and its projection outwardly therefrom into a scanning zone at two additional parallel planes spaced therefrom.

As shown in FIG. 7, bottom ends of the scan lines 4A,4C are initially disposed near the left side of the scanner window 20 and project outwardly to the right upon reaching the front end of the scan zone. Correspondingly, bottom ends of the scan lines 1A,1C are initially near the right side of the scanner window and project outwardly to the left upon reaching the front end of the scan zone. Accordingly, the portions of the laser beam 22a which trace these scan lines in each cycle cross each other within the scan volume between the window 20 and the scan zone front end.

As initially shown in FIG. 4, the pattern mirrors are arranged as a pair of right and left side mirrors 1, 4 spaced from opposite sides of the spinner 26 near the window bottom for directly receiving the laser beam 22a reflected from corresponding facets of the spinner. The laser beam 22a is in turn directly reflected off the side mirrors 1,4 and out the window 20 without intervening mirrors to effect the scan line first set 1,4,A,C.

The pattern mirrors also include a pair of right and left top mirrors 2, 3 spaced above the spinner 26 and behind the upper portion of the window. The top mirrors 2, 3 are generally diagonally mounted between the upper ends of the side mirrors 1, 4 for directly receiving the laser beam 22a reflected from the spinner, and in turn directly reflecting the laser beam through the window to effect the scan line second set 2,3,A–D.

As indicated above, the spinner facets preferably have different inclinations, as represented by the included angles E between the facets and the spinner base as illustrated in FIG. 3, for producing respective symmetrical sets of spaced apart scan lines from the pattern mirrors. The symmetrical sets are evident in the patterns illustrated in FIGS. 5 and 6, for example, by the different locations on the window of the scan lines defined by the suffixes A, B, C, and D.

As illustrated in FIGS. 4 and 5, the height of the window is preferably greater than the width of the window, and the spinner facets A–D and top mirrors 2,3 are sized and positioned in space to spread the scan lines in the second set substantially across the window height between its top and bottom. Furthermore, the spinner facets and top mirrors 2,3 are preferably positioned or oriented to diagonally incline the scan lines in the second set laterally across the window and with vertical overlap therebetween as best shown in FIG. 6 for obtaining full height and width coverage of the scan lines in the second set 2,3,A–D.

As shown in FIG. 4, the side mirrors 1,4 are preferably positioned symmetrically about the spinner 26 on opposite sides of the Y axis to effect symmetrical scan lines 1,4,A and 1,4,C which extend substantially the full height of the window. And, the top mirrors 2,3 are also positioned symmetrically about the spinner on opposite sides of the Y axis to effect symmetrical scan lines 2A–D and 3A–D in the second set.

The pattern mirrors 1–4 are also preferably positioned relative to the spinner 26 to diagonally cross or overlap the symmetrical scan lines in the first set, and to diagonally cross or overlap the symmetrical scan lines in the second set. In this way, the symmetrical scan lines cross each other for ensuring a successful scan of the barcode irrespective of its orientation.

In pass-by scanning, the barcode is swiped along the X axis as the laser beam is projected outwardly generally along the Z axis. The corresponding relative motion therebetween traces the laser beam across the barcode for decoding thereof. However, in presentation scanning, the barcode is presented along the Z axis which would have no relative motion with the laser beam emitted solely along that Z axis.

Accordingly, the side mirrors 1, 4 illustrated in FIG. 4 are respectively positioned on opposite sides of the second axis Y to the left and right thereof to direct the laser beam through corresponding left and right sides of the window to laterally invert position of the scan lines in the first set to the right and left sides, respectively, of the scan zone 28 as illustrated in FIG. 7. The initially left scan lines 4A,C are projected outwardly from the window in a rightward direction. Similarly, the initially right scan lines 1A, C are projected outwardly from the window in the leftward direction.

As they project outwardly in the scan zone, these scan lines in the first set cross each other and are inclined relative to the Z axis. In this way, as the barcode is presented along the Z axis, the scan line first set experiences relative motion therewith, with the left scan lines 1 A, C moving from right to left on the barcode with the right scan lines 4A, C moving from left to right on the barcode.

Furthermore, the top mirrors 2,3 illustrated in FIG. 4 are positioned relative to the spinner 26 to direct the laser beam 22a primarily downwardly toward the window bottom and through the bottom of the scan zone 28 illustrated in FIG. 7. In an exemplary embodiment, the laser beam forming at least the scan lines 2,3,B,D projects downwardly into the scan zone 28. The laser beam forming the lower portions of the scan lines 2,3,A,C projects downwardly for a majority of those scan lines. And, the laser beam forming the upper portions of the scan lines 2,3,A,C may project upwardly into the scan zone 28 for improved vertical height coverage.

Accordingly, the outwardly inclined scan line second set 2, 3 A–D additionally provides relative motion between the laser beam and the presented barcode. As the laser beam projects downwardly into the scan zone 28, the barcode presented inwardly toward the window causes the scan line projected thereon to move upwardly.

The pattern mirrors 1–4 are also preferably positioned relative to the spinner to diverge or expand the scan line pattern from the window 20 and through the length or depth of the scan zone 28 as illustrated in FIG. 7. In this way, the scan pattern spreads both laterally along the window width and vertically along the window height for providing a relative large three dimensional scan zone for dual mode scanning.

As indicated above with respect to FIG. 4 for example, the spinner 26 preferably includes four of the facets A–D arranged in a box of opposite and parallel sides. And, the four facets preferably have four different inclination angles E as shown in FIG. 3 for effecting the respective parallel scan lines therefrom as illustrated in FIG. 6.

As shown in FIG. 4, one pair of opposite spinner facets B,D are relatively short in length to reflect the laser beam against only the top mirrors 2,3 and not against the side mirrors 1,4. The laser beam 22a is directed along the Y axis toward the center of the spinner 26 to permit symmetrical sweep of the reflected laser beam therefrom counterclockwise from the right side of the second mirror 2 along an arc to the left side of the third mirror 3.

The second or remaining pair of opposite spinner facets A,C are relatively long in length as compared to the short facets B,D to reflect the laser beam 22a against all four of the top and side mirrors 1–4.

Since the scan lines of the first set 1,4,A,C are oriented generally vertically in the window 20 as illustrated in FIG. 6 they provide adequate vertical redundancy for pass-by scanning. Accordingly, additional vertical scan lines in that set which would otherwise be effected by the short spinner facets B, D are not necessary.

The long spinner facets A,C may therefore be used to additional advantage with the increased lengths thereof for correspondingly increasing the length of the scan lines effected upon tracing all four pattern mirrors 1–4.

The location and orientation of the spinner and pattern mirrors may be defined in any conventional manner using, for example, coordinate positions and right-hand-positive rotations as found in Opticad 4.0 commercially available from the Opticad Corporation, Santa Fe, N. Mex. Component definition may be obtained from the global coordinate system XYZ having an origin at the window center as described above. In an exemplary embodiment, a laser coordinate system is obtained by translating from the global system 3.1 inches in the Y direction, and −1.2 inches in the Z direction. This parallel intermediate coordinate system is then rotated minus 90° about its X axis to form the laser coordinate system in which the laser beam 22a is emitted along the positive Z axis thereof. As indicated above, the laser 22 itself may be conveniently positioned in available space, and the folding mirror 24 is positioned to direct the laser beam downwardly in the YZ plane of the global system.

Position and orientation of the pattern mirrors 1–4 are obtained by reference to local coordinate systems having origins centered at the bottom edges of the first and fourth mirrors 1,4, and adjoining top left and right corners of the second and third mirrors 2,3 as indicated by the black dots illustrated in FIGS. 2–4, with the bottom edges being parallel to a local X axis. The pattern mirror surface is initially normal to the pattern mirror coordinate system Z axis. Each mirror is then moved into position by the translations in inches and rotations in degrees in the following table, where the rotations are relative to the individual mirror local coordinate system in the sequence of rotation Z,X,Z.

| Mirror | X | Y | Z | Z(°) | X(°) | Z(°) |
| --- | --- | --- | --- | --- | --- | --- |
| 1 | 2.5 | −1.475 | −2.175 | −90.0 | 63.75 | 15.00 |
| 2 | 0.0 | 2.125 | −2.425 | −42.5 | 43.75 | 10.00 |
| 3 | 0.0 | 2.125 | −2.425 | 42.5 | 43.75 | −10.00 |
| 4 | −2.5 | −1.475 | −2.175 | 90.0 | 63.75 | −15.00 |

The spinner coordinate system is obtained by translating from the global system −2.45 inches in the Y direction, and −1.25 inches in the Z direction. This parallel intermediate system is then rotated −15° about its X axis to form the spinner coordinate system. The spinner is centered on this coordinate system as represented by the black dot in FIG. 5, and rotates about its Z axis.

As shown in FIG. 4, the distance J between the centers of the long spinner facets A,C is about 0.95 inches for example, and the distance K between the centers of the short spinner facets B,D is about 1.25 inches for example. The inclination angles E between the base of the spinner and the four spinner facets A, B, C, D as illustrated in FIG. 3 are 88.75°, 83.25°, 91.75°, and 80.0°, respectively.

In this way, position and orientation of the spinner facets, and position and orientation of the four cooperating pattern mirrors, along with the incident direction of the laser beam on the spinner defines the configuration and orientation of the pattern of scan lines projected outwardly through the window 20 for effecting both pass-by and presentation scanning.

As shown in FIG. 3, the scanner also includes suitable means for collecting and decoding the reflected light, designated 22b, from the barcode upon traversing the scan line thereacross. The reflected light 22b follows the reverse path through the scanner toward the laser 22 from which the laser beam originated. However, a collection lens 30 is optically aligned between the folding mirror 24 and the spinner 26 and includes a central bypass hole through which the outbound laser beam 22a may pass to the spinner 26 without obstruction. The inbound reflected light 22b will be collected and focused by the collection lens and reflected from the folding mirror 24 toward a conventional photodetector 32 which converts the modulated reflected light 22b into a corresponding electrical signal. The photodetector is operatively joined to a suitable electrical processor or decoder 34 which decodes the reflected light 22b to determine the information encoded in the barcode.

As indicated above, the scanner 10 is preferably mounted with its window 20 disposed vertically atop the counter 16. In this way, the scan zone 28 faces the user or clerk. Various products containing the barcodes 12 may then be swiped horizontally across the window generally along the first axis X for pass-by scanning.

Furthermore, the barcode 12 may be presented to the window 20 generally along the third axis Z for presentation scanning as well. In this way, the barcode may be scanned and decoded using the same scanner 10 simultaneously operated in both pass-by and presentation scanning modes. The same scanner may therefore be used in various retail establishments for conducting either pass-by or presentation scanning, or both.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A scanner for scanning a barcode comprising:

a housing including a window having a top and bottom and two sides, said window having a width along a first axis extending between said two sides thereof, and a height along a second axis extending between said top and bottom, with said window defining a back end of a scan zone extending perpendicularly outwardly therefrom along a third axis to a front end spaced apart from said back end of said scan zone;

a laser mounted in said housing for emitting a laser beam;

a rotary spinner disposed behind said window bottom, and having a plurality of mirror facets optically aligned with said laser for reflecting said beam in turn therefrom;

a plurality of pattern mirrors optically aligned with said spinner to effect a pattern of scan lines on said window including a first set of said scan lines extending substantially completely across said window height, and second set of said scan lines extending substantially completely across said window width; and said mirrors being positioned to laterally invert position of scan lines in said first set inside said scan zone between said back and front ends thereof, and to direct downwardly toward said window bottom said laser beam for producing scan lines in said second set, for effecting dual mode scanning of said barcode in a pass-by mode along said first axis and in a presentation mode along said third axis.

2. A scanner according to claim 1 wherein said pattern mirrors comprise:

a pair of side mirrors spaced from opposite sides of said spinner for directly receiving said laser beam therefrom, and in turn directly reflecting said laser beam through said window to effect said scan line first set; and a pair of top mirrors spaced from said spinner between said side mirrors for directly receiving said laser beam reflected from said spinner, and in turn directly reflecting said laser beam through said window to effect said scan line second set.

3. A scanner according to claim 2 wherein said spinner facets have different inclinations to produce respective sets of spaced apart scan lines from said pattern mirrors.

4. A scanner according to claim 3 wherein:

said window height is greater than said window width; and said spinner facets and top mirrors are sized to spread said scan lines in said second set substantially across said window height between said window top and bottom.

5. A scanner according to claim 4 wherein said spinner facets and top mirrors are positioned to diagonally incline said scan lines in said second set across said window, and with a vertical overlap therebetween.

6. A scanner according to claim 5 wherein:

said side mirrors are positioned symmetrically about said spinner to effect symmetrical scan lines in said first set; and said top mirrors are positioned symmetrically about said spinner to effect symmetrical scan lines in said second set.

7. A scanner according to claim 6 wherein said pattern mirrors are positioned relative to said spinner to diagonally cross scan lines in said first set, and to diagonally cross scan lines in said second set.

8. A scanner according to claim 6 wherein said pair of side mirrors are respectively positioned on opposite sides of said second axis to the left and right thereof to direct said laser beam through corresponding left and right sides of said window to laterally invert position of scan lines in said first set to right and left sides, respectively, of said scan zone.

9. A scanner according to claim 8 wherein said top mirrors are positioned relative to said spinner to direct said laser beam primarily downwardly toward said window bottom and through said scan zone.

10. A scanner according to claim 6 wherein said pattern mirrors are positioned relative to said spinner to expand said scan line pattern from said window and through said scan zone.

11. A scanner according to claim 6 wherein said spinner includes four of said facets arranged in a box of opposite and parallel sides.

12. A scanner according to claim 11 wherein said four spinner facets have four different inclinations.

13. A scanner according to claim 12 wherein one pair of said opposite spinner facets are short in length to reflect said laser beam against only said top mirrors and not against said side mirrors.

14. A scanner according to claim 13 wherein a remaining pair of said opposite spinner facets are long in length to reflect said laser beam against all four of said top and side mirrors.

15. A scanner according to claim 6 wherein said window is disposed vertically, with said first axis and window width extending horizontally, and said second axis and window height extending upwardly to position said scan zone for both pass-by and presentation scanning.

16. A scanner according to claim 6 further comprising means for collecting and decoding light reflected from said barcode upon traversing said scan lines thereacross.

17. A method of scanning a barcode using said scanner according to claim 6 comprising:

mounting said window vertically; and swiping said barcode horizontally across said window generally along said first axis for pass-by scanning said barcode.

18. A method of scanning a barcode using said scanner according to claim 6 comprising:

mounting said window vertically; and presenting said barcode to said window generally along said third axis for presentation scanning said barcode.

19. A scanner for scanning a barcode comprising:

a housing including a window defining a back end of a scan zone extending perpendicularly outwardly therefrom to a front end spaced apart from said back end of said scan zone;

a laser mounted in said housing for emitting a laser beam;

a rotary spinner including a plurality of mirror facets optically aligned with said laser for reflecting said beam in turn therefrom;

means including a plurality of pattern mirrors optically aligned with said spinner for reflecting said laser beam in a pattern of scan lines on said window including first and second sets of said scan lines, with scan lines in said first set being laterally inverted outwardly between said back and front ends of said scan zone, and scan lines in said second set being inclined through said window for effecting dual mode scanning of said barcode in a pass-by mode laterally across said window and in a presentation mode generally perpendicular to said window.

20. A scanner according to claim 19 wherein said reflecting means further comprise a pair of top pattern mirrors spaced above said spinner for directing said laser beam primarily downwardly in said second set, and a pair of side mirrors spaced from opposite left and right sides of said spinner for laterally inverting position of scan lines in said first set to right and left sides, respectively, of said scan zone.

* * * * *